UNITED STATES PATENT OFFICE.

JAMES ROBINSON HATMAKER, OF PARIS, FRANCE.

PROCESS OF PRESERVING ANIMAL TISSUES AND THE PRODUCTS OBTAINED THEREBY.

1,027,128. Specification of Letters Patent. Patented May 21, 1912.

No Drawing. Application filed February 28, 1906. Serial No. 303,550.

*To all whom it may concern:*

Be it known that I, JAMES ROBINSON HATMAKER, a citizen of the United States, residing at Paris, France, have invented a certain new and useful Improvement in Processes of Preserving Animal Tissues, and the Products Obtained Thereby, of which the following is a specification.

This invention relates to preserving, more particularly to the preservation of cooked or raw animal tissue.

One of the objects of the invention is to provide a practical and efficient process of the character described whereby animal tissue is preserved without substantially changing the nature of its constituents.

Another object is to provide a useful article of the class described which shall be preservable without the addition of artificial preservatives.

Another object is to provide a digestible article of the kind described whose components shall have substantially the same chemical composition as the corresponding components of the article before drying.

Other objects will be in part obvious and in part pointed out hereinafter.

The invention accordingly consists in the several steps and the relation and order of one or more of such steps with relation to each of the others thereof, and in the features of the product, which will be exemplified in the hereinafter disclosed matter, and the scope of the application of which will be indicated in the claims which follow.

The details of the process embodied in this disclosure of the invention are as follows: Animal tissue is first disintegrated in any suitable manner until it has such a pulpy consistency that it may be readily spread out in a very thin film or layer. The term "animal tissue" is intended to include those substances of a generally solid nature which have constituted a living animal or been part thereof, as oysters, fish, meat and the like. In order to obtain a proper consistency, in pulping a material like beef, it may be desirable to add a little water; on the other hand, it would probably not be necessary to make such addition in preparing oysters.

When the disintegration is complete the pulped material is spread out in a very thin film or layer upon a suitable heated surface and quickly dried. In practice, it has been found that the drying may be efficiently accomplished by thus exposing the material for a very few seconds to a temperature of 212° Fahrenheit, or more.

The film may be dried on suitable cylinders or plates and after drying may be broken up and reduced to powder.

It will thus be seen that a simple, expeditious and useful process is provided in which the objects of the invention are achieved.

It is obvious from the foregoing that the very thin film of organic tissue, when broken up and powdered, will form a fluffy, dust-like mass of material, containing only a small percentage of moisture. It has been found desirable to prepare a product containing less than twelve per cent. of moisture.

On account of the method and the rapidity of the drying there is little or no chance to take place for chemical change in the components of the material, and consequently the nature of the dried material is substantially the same after drying as it was before. It is, of course, to be understood that expressions of the nature of "no chemical change", used herein, are intended to convey the idea that there is no chemical change of importance other than the slight liberation of certain volatile products.

If the drying of organic tissue is not conducted rapidly, the resulting product will be cooked or at least there will be a change in its chemical constitution. For example, when meat is slowly heated and dried the tissue is decomposed and loses many of its original characteristics, assuming certain other properties on account of which the meat is termed "cooked". When, however, rapid heating and drying is employed, as herein described, the material may be preserved unchanged excepting the absence of water, and some other volatile products. The loss of volatile products other than water is extremely small.

It is to be understood that the details of this embodiment of the invention may be variously modified; that a thin film of disintegrated material may be prepared in other ways than that mentioned; and that the temperature and time occupied in drying may be suitably varied within proper limits.

This process is adapted to the preservation of raw tissue, as well as to the preserving of cooked tissue. Further, it is advantageously applicable to mixtures of animal tissue with various other substances not injuriously affected by the drying process.

The constituents of the finished products are substantially the same chemically as the corresponding constituents of the untreated material. The products of the process do not require the addition of artificial preservatives, since the method of drying described makes a dry sterile product. They are, further, fresh, distinguishing them from former salted preserved tissues. Their nutritive value and digestibility are, further, practically unimpaired.

What I claim and desire to secure by Letters Patent of the United States is:

1. The process which consists in finely dividing an animal substance, and exposing it in such form for an extremely short time to a medium heated sufficiently high to cause a substantially instantaneous evaporation of its contained moisture, said medium being at a temperature of over 212° Fahrenheit, whereby there is attained a dried, disintegrated substance containing less than 12 per cent. of water and whose components are substantially unchanged chemically from the corresponding components of the original substance.

2. The herein described process which consists in preparing a film of animal tissue and quickly drying said film at a temperature above 212° Fahrenheit, whereby substantially no chemical change occurs in said tissue.

3. An article, consisting of dried, fluffy, dust-like animal tissue which has been sterilized by exposing it in a thin film upon a surface heated to a temperature above 212° Fahrenheit, whose components contain less than 12 per cent. of water and are substantially the same chemically as the corresponding components of the original substance.

4. A dried, sterile, disintegrated animal substance containing less than 12 per cent. of water and having had the majority of its original water removed by a substantially instantaneous exposure to a very highly heated medium, the chemical composition of its components being substantially the same as that of the corresponding components of the original substance.

5. The hereinbefore described process of preserving animal tissue which consists in grinding such tissue with added water to a thin uniform pulp which can easily be spread out in a very thin film and in then spreading out such pulp, in a very thin film, upon a suitable drying surface heated in excess of 212° F. and allowing it to remain thereon until it contains less than 12% of water.

In testimony whereof I have signed my name to this specification in the presence of two subscribing witnesses.

JAMES ROBINSON HATMAKER.

Witnesses:
JOHN BAKER,
HANSON C. COXE.